(No Model.)

F. J. CLAMER.
PLATE FOR STORAGE BATTERIES AND PROCESS OF MAKING IT.

No. 549,899. Patented Nov. 19, 1895.

Witnesses:
Fredk. J. Lambert
Frank P. Ellis

Inventor.
Francis J. Clamer
by Thomas D. Mowlds
Attorney.

UNITED STATES PATENT OFFICE.

FRANCIS J. CLAMER, OF PHILADELPHIA, PENNSYLVANIA.

PLATE FOR STORAGE-BATTERIES AND PROCESS OF MAKING IT.

SPECIFICATION forming part of Letters Patent No. 549,899, dated November 19, 1895.

Application filed December 20, 1893. Serial No. 494,180. (No model.)

*To all whom it may concern:*

Be it known that I, FRANCIS J. CLAMER, a citizen of the United States, residing at Philadelphia, in the county of Philadelphia and State of Pennsylvania, have invented certain new and useful Improvements in Plates for Storage-Batteries; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to plates for electric storage-batteries, and the object is to produce a plate that will have the greatest possible amount of surface exposure.

The improvement consists in enveloping a porous core or center formed of oxide of lead with a porous metallic lead jacket.

To construct my improved battery-plate I first form a core of oxide of lead, making said core the same shape and very nearly the size desired for the finished plate. This core is constructed in substantially the same manner as when making a core for an ordinary hollow casting, the oxide of lead being mixed with any glutinous or sticky material that will hold it together and afterward baked or dried. When the core has been properly prepared, I suspend it in a suitable iron mold and pour into said mold a melted alloy of lead and zinc. The lead and zinc in this alloy must be thoroughly amalgamated before pouring, and should contain about ten per cent. of zinc and ninety per cent. of lead in order to make a good plate, although this proportion may be varied as will be found most suitable. After the metal has hardened and cooled in the mold, the plate is removed therefrom and placed in an acid bath, composed of a solution of sulphuric or other acid. The plate is allowed to remain in this acid bath until the zinc contained in the alloy is all eaten out, leaving only a porous metallic lead jacket surrounding the porous oxide core in the center. It is then ready for use in the ordinary manner.

Figure 1:
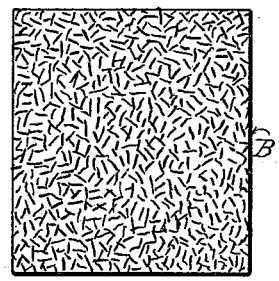
Figure 2:
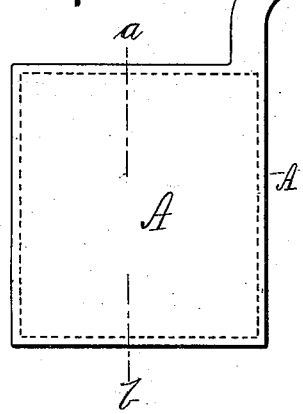
Figure 3:
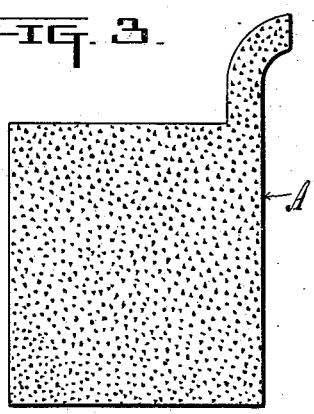
Figure 4:
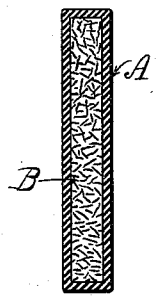

In the accompanying drawings, Figure 1 shows a view of the lead oxide core. Fig. 2 shows a plate as it appears when first removed from the mold. Fig. 3 is a view of the plate after being subjected to the acid bath. Fig. 4 is a vertical section through the plate on line *a b*.

A represents the zinc-lead casting surrounding the porous core of lead oxide.

A' is the porous metallic lead jacket made by eating out the zinc in the casting A.

B is the porous lead oxide core inclosed in the jacket A'.

In order to produce a thorough amalgamation of the lead and zinc forming the metallic jacket, the two metals are melted together in the usual way, and while in a liquid condition caustic soda is introduced below the surface thereof, the mass being stirred meanwhile.

If it is desired to make the porous metallic lead jacket that envelops the core somewhat stiffer and stronger, about one per cent. of aluminum is added to the zinc and lead forming the metal alloy. As the aluminum is not acted upon by the acid, this metal is left in combination with the metallic lead forming the porous jacket, thereby making said jacket much stiffer.

Having thus described my invention, what I claim as new, and desire to secure by Letters Patent of the United States, is—

1. A plate for electric storage batteries consisting of a central core of oxide of lead enveloped in a porous metallic jacket of lead and aluminum, as set forth.

2. The herein described process of manufacturing porous plates for storage batteries, consisting of mixing a quantity of oxide of lead with a suitable binding material and forming a core of the same; drying said core, then suspending it in a suitable mold and pouring therein a melted alloy of lead and zinc to form a metallic jacket or envelope around the core; afterward immersing the plate thus formed in a suitable acid, allowing it to remain therein, until the zinc in the jacket has been eaten out, leaving a porous lead jacket enveloping the central core, substantially as described.

3. The herein described metallic blank for making plates for electric storage batteries consisting of a central core of oxide of lead enveloped in a metallic jacket composed of an alloy of lead, zinc and aluminum, as set forth.

In testimony whereof I affix my signature in presence of two witnesses.

FRANCIS J. CLAMER.

Witnesses:
SAML. H. KIRKPATRICK,
THOS. D. MOWLDS.